United States Patent [19]
Kuhn

[11] 4,174,615
[45] Nov. 20, 1979

[54] DEVICE FOR THE VENTING OF AN HYDRAULICALLY LOADED SYSTEM

[75] Inventor: Wolfgang Kuhn, Kaarst, Fed. Rep. of Germany

[73] Assignee: International Harvester Company, Chicago, Ill.

[21] Appl. No.: 950,094

[22] Filed: Oct. 10, 1978

[30] Foreign Application Priority Data

Oct. 18, 1977 [DE] Fed. Rep. of Germany ... 7732163[U]

[51] Int. Cl.² ............................................. F15B 21/04
[52] U.S. Cl. ......................................... 60/453; 60/584; 188/352
[58] Field of Search ...................... 60/453, 584, 327; 188/352

[56] References Cited
U.S. PATENT DOCUMENTS

| | | | |
|---|---|---|---|
| 2,150,617 | 3/1939 | Weihe | 188/352 |
| 4,038,823 | 8/1977 | Mostert | 60/584 |

*Primary Examiner*—Edgar W. Geoghegan
*Attorney, Agent, or Firm*—Raymond E. Parks; Frederick J. Krubel; F. David AuBuchon

[57] ABSTRACT

An auxiliary hydraulic fluid circuit for purging air from a hydraulic brake system in either an agricultural or industrial type of tractor vehicle by diverting hydraulic fluid through the auxiliary circuit from the hydraulic power system of the tractor into the hydraulic brake system. The fluid diverted into the brake system is observed flowing, through transparent means in conduits comprising the auxiliary circuit, until the fluid flow is clear, to the reservoir of the hydraulic power system. At which event, the brake system is now purged of air and the hydraulic circuit is disconnected between the tractor hydraulic power and brake systems.

4 Claims, 1 Drawing Figure

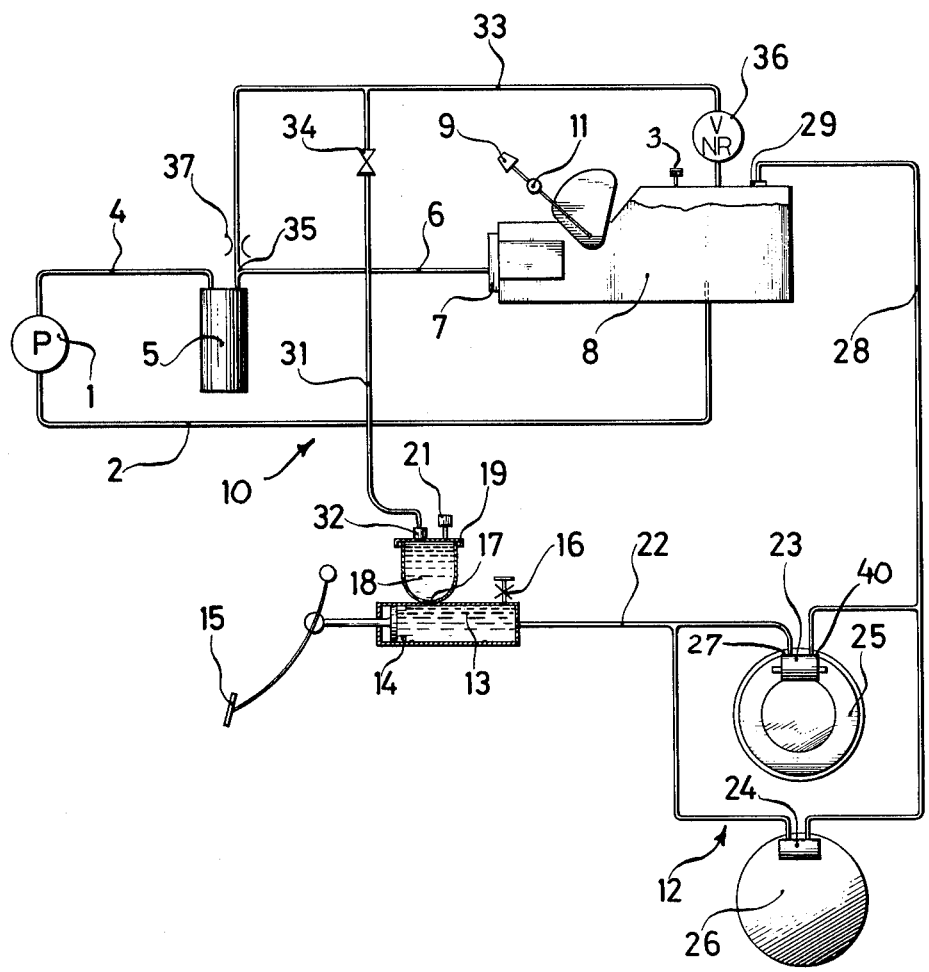

DEVICE FOR THE VENTING OF AN HYDRAULICALLY LOADED SYSTEM

This invention relates to an auxiliary hydraulic circuit for purging air from a hydraulic brake system in agricultural and industrial type of tractors. In particular, the invention concerns purging air from a main brake cylinder provided with a reservoir, and from a brake line and a cylinder connected to the brake cylinder by means of a brake line. More particularly, the invention relates to a circuit which transfers hydraulic fluid from a feed line connected to a hydraulic pump, comprising part of the tractor hydraulic power system, to the tractor hydraulic brake system for purging air from the brake system.

DESCRIPTION OF THE PRIOR ART

A means for purging air from a brake system is shown in German laid open (DOS) patent application No. 2,547,501—Mostert—laid open date of Apr. 29, 1976. The means comprise a hydraulic fitting which is connected to a servo unit in the brake system. A pump supplies fluid to the servo system through the fitting, which includes a vent that permits air and the fluid to escape into the atmosphere. The fluid is permitted to flow through the servo cylinder until the fluid escaping through the vent flows clear of bubbles. The pump is then disconnected from the fitting and the vent is sealed. One disadvantage of this system is that the fluid is permitted to drain from the hydraulic system risking spilling the fluid, and another disadvantage is that an auxiliary pump is required to furnish the purging fluid to the servo system.

SUMMARY OF THE INVENTION

According to the invention, an auxiliary hydraulic fluid circuit is provided for purging air from a hydraulic brake system in either an agricultural or industrial type of tractor vehicle by diverting hydraulic fluid through the auxiliary circuit from the tractor hydraulic power system into the tractor hydraulic brake system. A first conduit, having transparent means, is connected at one end to a feed line of the tractor hydraulic power system, through a fluid flow restrictor means and at the other end is connected to a hydraulic fluid reservoir, for the power system, through a one way flow control valve. Another conduit, having transparent means, is connected at one end into a bleed vent in a servo cylinder unit of the brake system, and at the other end is connected to the power system fluid reservoir. A still further conduit or branch line, having transparent means, is connected at one end to the first conduit upstream of the one way valve and is connected at the other end to a fluid reservoir for the master brake cylinder of the brake system. A manually operable valve controls the flow of fluid from the first conduit into the branch line. A manually operated control valve, in the hydraulic power system, is placed into a neutral position thereby permitting a portion of the fluid flowing through the pump output or feed line to be diverted through the restrictor means into the first conduit and thence into the power system reservoir through the one way valve. Once the fluid, which is observed through the transparent means, begins flowing clear of bubbles, the control valve in the branch line, hereinafter called the second conduit, is opened and the fluid is then directed into the reservoir of the master brake cylinder. A vent is provided in the brake fluid reservoir which allows the air to escape as the power system fluid is filling the brake fluid reservoir. Once the brake fluid reservoir is filled, a vent valve on the master cylinder is opened and the fluid now flows into the master cylinder and then through a control line into an intake port in the servo cylinder unit of the brake system and then through a bleed vent in the unit into the third conduit, provided with the transparent means, which is connected to the power system reservoir at the discharge end thereof. Once the fluid is observed flowing clear in the second and third conduits, the valve in the branch or second conduit is shut off as well as the valve on the master brake cylinder. The second and third conduits may now be removed and the supply ports on the brake fluid reservoir and the bleed vent in the servo cylinder units are sealed. Thus, the pump of the power system is used to supply fluid to the brake system for purging the brake system of air with no fluid being spilled during the bleeding of the fluid through the vent in the servo cylinder unit because the bleed fluid is returned back to the power system reservoir rather than being collected in some container. By applying the means described in the invention, a fluid circuit for venting a brake system is obtained which does not only represent an economic design but is also easy to install on existing agricultural and industrial tractors having hydraulic power and brake systems. One advantage to be seen is in the fact that the same hydraulic pump which is used for the hydraulic power system is used to supply the purging fluid for the brake system. Another advantage is in the fact that the hydraulic fluid that is bled during the air purging process is not bled to the atmosphere chancing a spill or contamination of the fluid, but is returned back to the fluid power reservoir. It is not necessary to have transparent means in the conduits to work the invention, as the conduits themselves may be made of a transparent material.

DESCRIPTION OF THE PREFERRED EMBODIMENT

With reference to the single FIGURE of the drawing there are shown two hydraulic fluid power systems. One is the hydraulic power system 10 and the other is the hydraulic brake system 12. The power system 10 comprises a hydraulic pump 1 which draws fluid from a reservoir, not shown, in a power lift housing 8 through a suction line 2. The output of the pump 1 is directed to an output line 4 which is connected to a pressure filter 5. A feed line 6 connects the output side of the pressure filter 5 to a hydraulic consuming device 7 designed in the form of a power lift as is used on known agricultural and industrial type of tractors. The power lift housing 8 is provided with two hand levers 9 and 11 which are used for the draft and position control of an implement hitched to the tractor and forms no part of this invention. A control valve means, not shown, comprises a part of the power system 10, which can be adjusted to a neutral position by the two levers 9, 11, thereby directing the fluid in feed line 6 to the reservoir, not shown, in the power lift housing 8. An air vent 3 is provided on top of the power lift housing 8.

In the vehicle hydraulic brake system 12 there is a master brake cylinder 13 in which a piston 14 can be moved in an axial direction by the depressing a brake pedal 15. A brake fluid reservoir 18 is shown communicating with the master brake cylinder 13 through an opening or bore 17. The master brake cylinder 13 is vented through a manually adjustable valve means 16 and the brake fluid reservoir 18 is vented through a breather 21. The master brake cylinder 13 communicates via a brake line 22 with a fluid inlet port 27 in each of the servo cylinder units 23, 24 which are on opposite sides of the vehicle, and are respectively associated with wheel brakes 25, 26. The servo cylinder units are each provided with a vent means 40 to which conduit 28 is connected. Conduit 28 is provided with transparent means for viewing the fluid flowing therein and is connected to a port 29 in the power lift housing, which discharges into the reservoir, not shown, in the power lift housing.

A throttle or flow restrictor means 37 is connected at tap 35 to the feed line 6. An intermediate line or conduit 33 having transparent means for viewing the fluid flowing therein communicates the throttle to the power system reservoir, not shown, through a one way valve 36. A second conduit 31 having transparent means for viewing the fluid flowing therein is connected to the first conduit 33 and communicates feed line 6 with the brake fluid reservoir 18 through a port 32 in the brake fluid reservoir when the control levers 9, 11 position the control valve means in a neutral condition. A manually operated valve 34 controls the flow of fluid from the first conduit 33 into the second conduit 31. The first, second and third conduits 33, 31 and 28 may be made of a transparent material or some transparent means may be provided in these three lines of the auxiliary hydraulic fluid circuit to observe the passage of fluid therethrough.

DESCRIPTION OF THE OPERATION

When it is necessary to vent the brake system 12 of air, one end of the first conduit 33 and associated throttle 37 are connected at tap 35 to the feed line 6, and the opposite end is connected to the one way valve 36 which communicates with the power system reservoir in housing 8. The second conduit 31 is then connected to port 32 in the brake fluid reservoir 18, and the valve 34 is closed shut. One end of the brake vent line or third conduit 28 is connected to the vent means 40 in each servo cylinder unit 23, 24 and the opposite end is connected to port 29 in the housing 8. Levers 9 and 11 are moved into the neutral position for the power lift control valve means. A portion of the fluid in feed line 6, which is pumped from the hydraulic pump 1, now passes through the restrictor or throttle 37 into the first conduit 33 and into the reservoir, not shown, in the power lift housing 8 through the one way valve 36. Since the first conduit 33 is made of a transparent material or has transparent means, the operator is able to observe when clear hydraulic fluid flows in line 33 into the power lift housing 8. As soon as the hydraulic fluid clears, the valve 34 and the second conduit 31 is opened to let the hydraulic fluid in line 33 flow into and fill the brake fluid reservoir 18. As the brake fluid reservoir fills, air is expelled through the breather 21. Once the fluid reservoir is filled the valve 16 on the master brake cylinder is opened expelling air from the cylinder as it fills. Once it is filled, the valve 16 is closed and the fluid is now forced into the brake line 22 and into the inlet ports 27 in the servo cylinder units 23, 24 associated therewith. The fluid being pumped by pump 1 into the brake fluid reservoir 18 now passes into the master cylinder 13, via bore 17, and thence into brake line 22 to each of the servo cylinder units 23, 24. The fluid in the servo cylinder units now is vented or bled through the vent means 40 into the third conduit 28 and thence through port 29 into the reservoir in the power lift housing 8. The fluid is permitted to pass from the power system 10 through the brake system 12 to the reservoir in the housing 8 until the fluid flows clear in all three transparent lines 33, 31 and 28. When this occurs, the brake system 12 is considered to be purged of air. The valve 34 is then closed. When the venting or air purging process is completed, the auxiliary hydraulic circuit comprising the second and third conduits 31 and 28 can be removed and the ports 32 and 29 and the vent means 40 sealed.

It is to be understood that the invention is not limited to the embodiment shown, but also allows modification within the scope of the claims. One modification would be to connect the second conduit 31 directly to the servo units 23, 24 and to effect the venting in reverse order. In another embodiment, third conduit 28 does not have to be connected to the power lift reservoir in housing 8 but can be connected to a separate container used to collect the fluid being discharged from the servo units. In this last embodiment it would not be necessary to use transparent vent lines as the operator could observe the fluid flowing into the container.

What is claimed is:

1. An auxiliary hydraulic fluid circuit for purging air from a hydraulic brake system in a tractor vehicle of the agricultural or industrial type by diverting hydraulic fluid from a hydraulic power system on the tractor into the hydraulic brake system, comprising:

a hydraulic feed line means for supplying fluid to the hydraulic power system;

a first conduit having means for observing fluid flow therethrough and having an intake end connected to the feed line and having a discharge end connected to a one way valve communicating with a fluid reservoir of the hydraulic power system;

a second conduit having means for observing fluid flow therethrough and having an intake end connected to the first conduit upstream of the one way valve and having a discharge end connected to a brake fluid reservoir;

a fluid control valve means in the second conduit for controlling the flow of fluid therethrough;

a third conduit having means for observing fluid flow therethrough and having an intake end connected to a vent means in a brake servo cylinder unit means and having a discharge end connected to the fluid reservoir of the hydraulic power system;

and a master brake cylinder communicating with the brake fluid reservoir and including a brake line communicating the master brake cylinder to a fluid inlet port in the brake servo cylinder unit.

2. The invention as claimed in claim 1 wherein the three conduits are made of transparent material.

3. The invention according to claims 1 or 2 wherein a fluid flow restrictor means is provided in the first conduit for restrictively communicating the feed line to the first conduit.

4. The invention according to claims 1, 2, or 3 wherein breathers are provided in the fluid reservoir, in the power system and in the brake fluid reservoir.

* * * * *